US008144794B2

(12) United States Patent
Ojard

(10) Patent No.: US 8,144,794 B2
(45) **Date of Patent: *Mar. 27, 2012**

(54) EFFICIENT OPTIMAL ML DETECTOR

(75) Inventor: Eric Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 12/760,665

(22) Filed: Apr. 15, 2010

(65) Prior Publication Data

US 2010/0232551 A1 Sep. 16, 2010

Related U.S. Application Data

(63) Continuation of application No. 11/269,453, filed on Nov. 7, 2005, now Pat. No. 7,702,026.

(60) Provisional application No. 60/676,132, filed on Apr. 28, 2005.

(51) Int. Cl.
*H04L 7/04* (2006.01)

(52) U.S. Cl. ........ 375/262; 375/260; 375/340; 375/341; 375/347; 375/349; 455/500; 455/501

(58) Field of Classification Search .................. 375/262, 375/260, 340, 341, 347, 349; 455/500, 501
See application file for complete search history.

(56) References Cited

U.S. PATENT DOCUMENTS 7,289,585 B2 10/2007 Sandhu et al.
7,702,026 B2 * 4/2010 Ojard ........................... 375/262

* cited by examiner

*Primary Examiner* — Phuong Phu
(74) *Attorney, Agent, or Firm* — Garlick & Markison; Bruce E. Garlick

(57) ABSTRACT

An efficient optimal maximum-likelihood output detector reducing the complexity of demodulation/decoding computations in multiple-input multiple-output communication systems. A plurality of received signals may be combined into a plurality of combined received signals by multiplication of a matrix representing the plurality of received signals with another matrix that meets certain conditions. The plurality of combined received signals may then allow for slicing operations as well as calculation of distance metrics with significantly reduced complexity.

20 Claims, 3 Drawing Sheets

BEGIN

200: Receive plurality of signals and represent via vector r.

202: Select matrix W such that WH is approximately triangular.

204: Multiply W with r, to produce plurality of combined signals represented by vector y = Wr.

206: For each candidate constellation point $x_{1,i}$, $i = 1 \ldots M^2$
1) Find $x_2$ to minimize $|y_2 - bx_{1,i} - cx_2|^2$, by slicing $y_2 - bx_{1,i}$.
2) Calculate distance metrics $D_i$.

209: Find $i$ which minimizes $D_i$ (create hard output).

210: Calculate log-likelihood ratios $\tilde{L}_k$ for each bit represented in symbol $x_1$ (create soft output).

END

END

EFFICIENT OPTIMAL ML DETECTOR

CROSS-REFERENCE TO RELATED APPLICATION

The present application claims priority to U.S. patent application Ser. No. 11/269,453 filed on Nov. 7, 2005, which in turn claims priority to U.S. Provisional Patent Application Ser. No. 60/676,132 filed on Apr. 28, 2005, and entitled "AN EFFICIENT OPTIMAL ML DETECTOR." These applications are incorporated herein by reference in their entireties.

BACKGROUND

This invention relates to the field of communication systems, and in particular, efficient maximum-likelihood (ML) detection for multiple-input multiple-output (MIMO) communication systems.

Wireless, as well as wired, communication systems may achieve high spectral efficiency by transmitting information over multiple antennas at the same time (i.e. simultaneously), or at about the same time, using the same frequency band. These systems are known as multiple-input multiple-output, or MIMO, systems.

One problem in designing MIMO systems is demodulating the received signals to recover transmitted bits. Typically, each received signal contains components of all transmitted signals, making demodulation more complicated than in a single-input single-output (SISO) system. To address this, many receivers employ linear equalization to separate the received signals. This approach is attractive for its low computational complexity, but it introduces a substantial performance penalty, resulting in significantly reduced data rates or ranges compared to what may otherwise be possible.

For better performance, ML detection may be used. Given a MIMO system described by r=Hx+n, where r is the received signal vector, H is the known (or estimated) channel matrix and n is additive noise, an ML detector searches over all possible transmit symbol vectors x to find the vector x which minimizes $\|r-Hx\|^2$. In a system with $N_t$ spatial streams, each employing an $M^2$-point constellation, this requires calculating $M^{2N_t}$ distance metrics. For example, in a system with two transmitted spatial streams, both transmitting 64-QAM QAM=quadrature amplitude modulation) constellations, this method would require calculating $64^2$=4096 distance metrics. This complexity is too costly and power-intensive for many applications.

To reduce the cost and power consumption, some systems employ sub-optimal ML schemes, such as sphere decoding. These schemes seek to reduce the amount of computation by reducing the size of the search space. Unfortunately, in exchange for reduced complexity, these schemes may sacrifice performance and/or exhibit high variance in computation times, making such schemes undesirable for many applications.

In view of the above, there is a need for improved detection techniques for MIMO systems.

SUMMARY

An apparatus and/or method for decoding multiple-input multiple-output transmissions, capable of performing optimal ML detection with reduced computational complexity, substantially as shown in and/or described in connection with at least one of the figures.

BRIEF DESCRIPTION OF THE DRAWINGS

These and other features, aspects and advantages of the present invention will be more fully understood when considered with respect to the following detailed description and accompanying drawings, wherein.

DETAILED DESCRIPTION

The invention is described below, with reference to detailed illustrative embodiments. It will be apparent that the invention may be embodied in a wide variety of forms, some of which may be quite different from those of the disclosed embodiments. For example, while multiple-input multiple-output (MIMO) technology is often used in conjunction with wireless technology, the teachings of the invention may also be used in a wired system. Consequently, the specific structural and functional details disclosed herein are merely representative and do not limit the scope of the invention.

The invention described herein is capable of finding the optimal ML result with significantly reduced complexity compared to conventional schemes. Compared to conventional ML detectors, the invention described herein is capable of finding the same result with a complexity reduction on the order of a factor of $M^2$, where $M^2$ is the number of points in the constellation (e.g. M=8 in a 64-QAM system).

Figure 1:
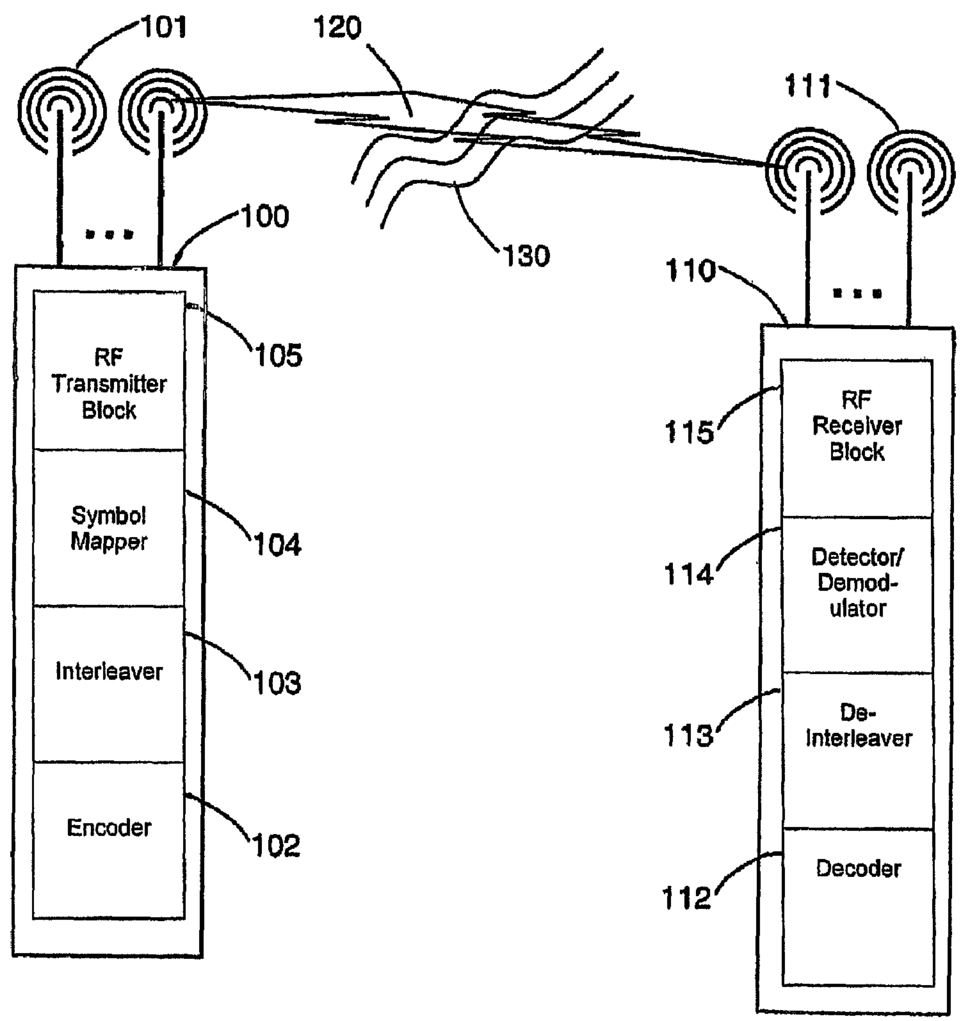
FIG. 1 is an overview diagram of one embodiment of a system of two stations communicating in accordance with the invention (while the teachings of the invention may be incorporated into both wired and wireless communication, FIG. 1 shows wireless communication)

FIG. 1 shows one embodiment of a communication system including two communication stations 100, 110 communicating with each other. Stations 100, 110 may both be transceiver stations, capable of sending and receiving signals, or one could be sending only while the other only receives. Both stations could be communicating exclusively with each other or could be part of a greater communication network including other communication stations.

In the wireless multiple-input multiple-output system of FIG. 1, each station is capable of transmitting and/or receiving information via multiple antennas 101, 111, operating in the same, similar, or overlapping frequency bands. Hence, transmissions 120 between stations 100, 110 generally include a plurality of signals via multiple transmission channels. Also, the components in the system and the characteristics of the transmission channels will generally add noise, for example thermal noise and external interferences 130, to the signals during transmission.

Communication stations 100, 110 include electronic circuitry for the processing of information. Presuming that station 100 is capable of at least transmitting information, in some embodiments station 100 may generally include electronic circuitry for encoding signals 102, interleaving signals 103, symbol mapping 104 and radio frequency (RF) transmission 105. Similarly, presuming that station 110 is capable of at least receiving information, in some embodiments station 110 may generally include electronic circuitry for radio frequency reception 115, symbol detection/demodulation 114, de-interleaving 113 and decoding 112.

Figure 2:
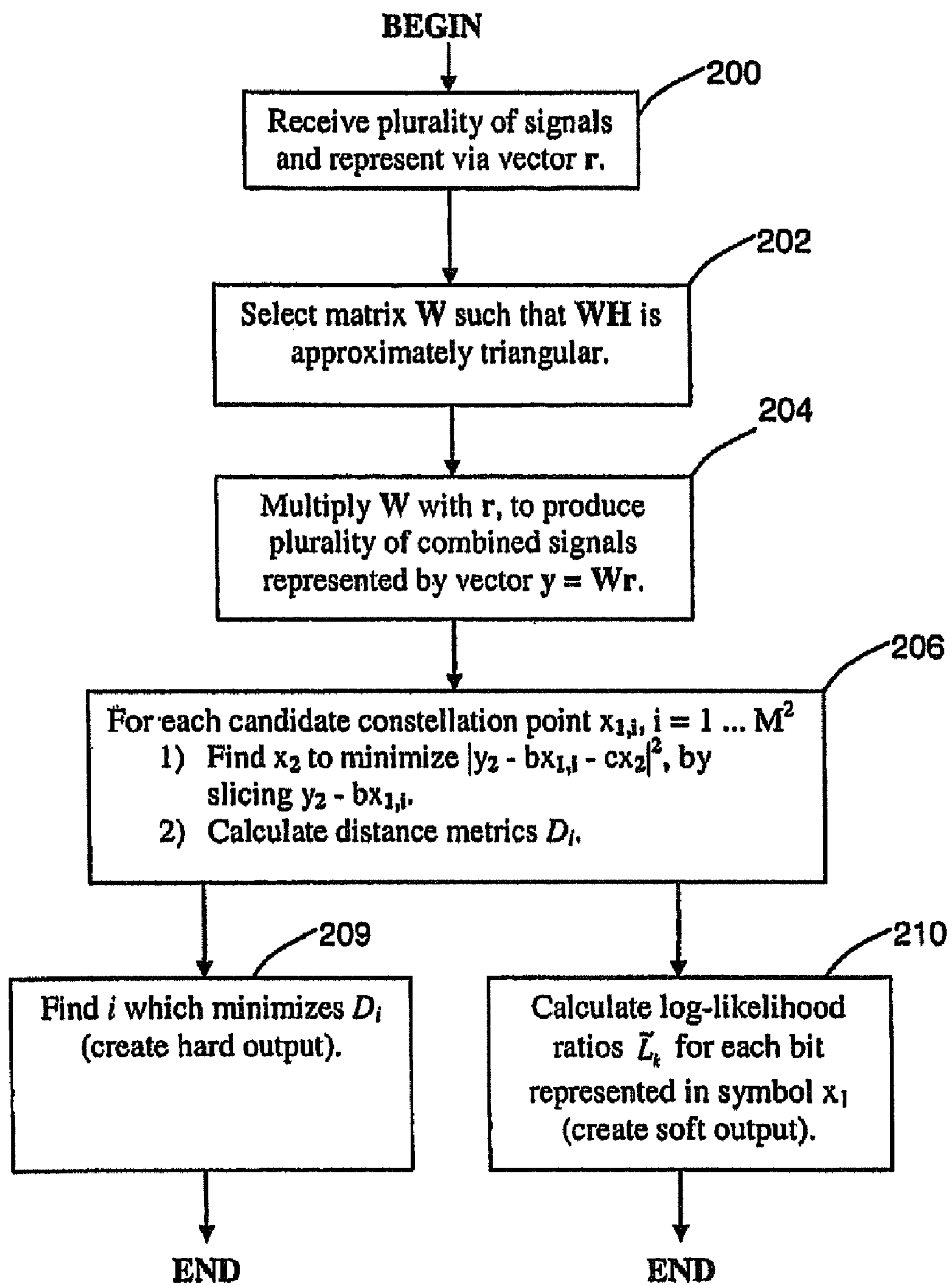
FIG. 2 is a simplified flowchart of one embodiment of demodulation/decoding steps in accordance with the invention.

Referring now to FIG. 2, operations relating to the detecting/demodulating of received transmissions (e.g., block 114 in FIG. 1), particularly of received pluralities of signals in multiple-input multiple-output systems in accordance with the invention, will be described in more detail. FIG. 2 shows a descriptive flowchart of the steps followed by one embodiment of the present invention.

First, as represented by block 200, a plurality of signals is received by a communication station. The signals may be represented as a vector r. Received signal vector r relates to transmitted symbol vector x as follows:

$$r=Hx+n \qquad \text{EQUATION 1}$$

wherein H represents the channel matrix and n represents noise.

In the case of a 2×2 multiple-input multiple output system, the above notation may be expanded to:

$$\begin{bmatrix} r_1 \\ r_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix} \qquad \text{EQUATION 2}$$

As represented by block 202, the system selects a matrix W. It is desirable to choose W such that the matrix product WH is triangular or nearly triangular, i.e. all of the elements above or below the diagonal should be zero or near zero. If $n_1$ and $n_2$ are uncorrelated, the matrix product $WW^H$ may preferably be diagonal or nearly diagonal, i.e., a matrix where the off-diagonal terms are zero or near zero. Here, $W^H$ represents the Hermitian transpose of the matrix W. To the extent that these conditions are not met, performance may be compromised.

In some embodiments one simple choice for a matrix W in a 2×2 multiple-input multiple output system is $$W = \begin{bmatrix} w_1 \\ w_2 \end{bmatrix} = \begin{bmatrix} \tilde{h}_{2,2} & -\tilde{h}_{1,2} \\ \tilde{h}_{1,2}^* & \tilde{h}_{2,2}^* \end{bmatrix}, \qquad \text{EQUATION 3}$$

$$\text{where } \begin{bmatrix} \tilde{h}_{1,1} & \tilde{h}_{1,2} \\ \tilde{h}_{2,1} & \tilde{h}_{2,2} \end{bmatrix} \equiv HP$$

In Equation 3, P represents a permutation matrix. To decode a symbol $x_j$ of a received signal (with j=1, 2), P could have the following values:

$$P = \begin{cases} \begin{bmatrix} 1 & 0 \\ 0 & 1 \end{bmatrix} & \text{if } j = 1 \\ \begin{bmatrix} 0 & 1 \\ 1 & 0 \end{bmatrix} & \text{if } j = 2 \end{cases} \qquad \text{EQUATION 4}$$

However, other choices are possible for W, allowing for trade-offs between the complexity of calculating W and the resulting complexity of calculating log-likelihood ratios. These choices include, but are not limited to, the following approaches:

One approach may be to make the entry in column 1, line 1 of the matrix product WH a real number (as opposed to a complex number, i.e., a number that includes a real and an imaginary component based on the value of $\sqrt{-1}$). This approach reduces the complexity of calculating distance metrics, discussed infra. Making the entry in column 1, line 1 of the matrix product WH a real number may be achieved by defining $w_1$ as follows:

$$w_1 = [\, \tilde{h}_{2,2} \quad -\tilde{h}_{1,2} \,] \frac{|\det(HP)|}{\det(HP)} \qquad \text{EQUATION 5}$$

Another approach that may reduce the complexity of calculating distance metrics involves setting column 1, line 1 of the matrix product WH to a value of 1, which may be achieved by defining $w_1$ as follows:

$$w_1 = [\, \tilde{h}_{2,2} \quad -\tilde{h}_{1,2} \,] \frac{1}{\det(HP)} \qquad \text{EQUATION 6}$$

Another approach may be to make the entry in the last column and line of the matrix product WH a real number. This reduces the complexity of the slicing operation, discussed infra. This condition is already true for the choice of $w_2$ in Equation 3.

Similarly to the approach of setting column 1, line 1 of the matrix product to a value of 1, the last column and line of the matrix product WH may also be set to a value of 1. To do so, $w_2$ may be defined as follows:

$$w_2 = [\, \tilde{h}_{1,2}^* \quad \tilde{h}_{2,2}^* \,] \frac{1}{|\tilde{h}_{1,2}|^2 + |\tilde{h}_{2,2}|^2} \qquad \text{EQUATION 7}$$

Finally, the diagonal values of the matrix W may be set to equal values to reduce the complexity of calculating distance metrics. This condition is true for the choices for matrix W suggested in Equations 3 and 5.

Referring again to FIG. 2, once a matrix W is selected, the term $$\|r-Hx\|^2 \qquad \text{TERM 1}$$

can, in a 2×2 multiple-input multiple output system, be represented by $$\left\| \begin{bmatrix} 1/\sqrt{K_1} & 0 \\ 0 & 1/\sqrt{K_2} \end{bmatrix} (Wr - WHx) \right\|^2 \qquad \text{TERM 2}$$

where $K_i$ (here: i=1, 2) represent the diagonal values in the matrix product $WW^H$. In a 2×2 multiple-input multiple-output system, $K_1$ and $K_2$ would represent the following entries:

$$WW^H = \begin{bmatrix} K_1 & 0 \\ 0 & K_2 \end{bmatrix} \qquad \text{EQUATION 8}$$

TERM 2, in turn, may be represented as $$\frac{1}{K_1}|y_1 - ax_1|^2 + \frac{1}{K_2}|y_2 - bx_1 - cx_2|^2 \qquad \text{TERM 3}$$

where $y_i$ (i=1, 2) are components of vector y, which is the result of the product of matrix W and received signal vector r (block 204), i.e. y=Wr, and where a, b and c are values derived from the product of matrix W and channel matrix H as follows:

$$WH = \begin{bmatrix} a & 0 \\ b & c \end{bmatrix} \qquad \text{EQUATION 9}$$

When searching for the minimum value of TERM 3 over $x_2$, the search may be limited to the subterm $$|y_2-bx_1-cx_2|^2 \qquad \text{TERM 4}$$

as $x_2$ does not appear anywhere in the remainder of TERM 3. However, the minimum value of TERM 4 over $x_2$ may also be determined by use of a slicing operation:

$$\min_{x_2}|y_2-bx_1-cx_2|^2 = |y_2-bx_1-S^c(y_2-bx_1)|^2 \qquad \text{EQUATION 10}$$

where $S^c(y)$ returns the constellation point closest to y/c. This operation is commonly referred to as slicing. For most constellation types (e.g. square-QAM constellations), slicing is a trivial operation, requiring little hardware or power. Slicers are well-understood and widely used in communication systems. Substitution of the minimum operation by a slicing operation reduces the complexity of calculating distance metrics $D_i$ from $O((M^2)^2)$ to $O(M^2)$, $M^2$ being the number of points in a two-dimensional QAM constellation (block 206; see also the discussion of FIG. 3, infra).

For $M^2$-QAM constellations, $S^c(y)$ may be defined by Equation 11.

For $M^2-QAM$ constellations, EQUATION 11

$$S^c(y) \equiv c\min\left(\max\left(2\left\lfloor \mathrm{Re}\left\{\frac{y}{2c}\right\}+1\right\rfloor-1,\,-M+1\right),\,M-1\right) + ic\min\left(\max\left(2\left\lfloor \mathrm{Im}\left\{\frac{y}{2c}\right\}+1\right\rfloor-1,\,-M+1\right),\,M-1\right)$$

where $\lfloor\cdot\rfloor$ denotes the largest integer not greater than $\cdot$, and $i \equiv \sqrt{-1}$.

As shown in Equation 11, this operation has low complexity for square-QAM constellations, as it may be performed using a simple combination of scaling, truncation, and comparison operations. For non-square QAM constellations (e.g. 32-cross), the slicing operation may require additional logic, but may still be much simpler than performing an exhaustive search over $M^2$ points. Slicers for non-square constellations are also well-understood and commonly used in communication systems.

The following formulas (collectively referred to as Equation 12) show a detailed walkthrough of how matrix W may be used to decrease the complexity of computations for calculating log-likelihoods in a 2×2 multiple-input multiple output system. Initially, assuming the system has additive white Gaussian noise where $n_1$ and $n_2$ are uncorrelated Gaussian variables, the max-log approximation $\tilde{L}_k$ of the log-likelihood ratio for bit k is defined in the first formula.

EQUATION 12

$$\begin{aligned}\tilde{L}_k &= \frac{1}{\sigma^2}\left(\min_{x|b_k=0} - \min_{x|b_k=1}\right)\|r-Hx\|^2 \\ &= \frac{1}{\sigma^2}\left(\min_{x|b_k=0} - \min_{x|b_k=1}\right)\left\|\begin{bmatrix} 1/\sqrt{K_1} & 0 \\ 0 & 1/\sqrt{K_2}\end{bmatrix}(Wr-WHx)\right\|^2 \\ &= \frac{1}{\sigma^2}\left(\min_{x|b_k=0} - \min_{x|b_k=1}\right)\left(\frac{1}{K_1}|y_1-ax_1|^2+\frac{1}{K_2}|y_2-bx_1-cx_2|^2\right)\end{aligned}$$

Then, for all bits $k$ represented entirely in symbol $x_1$:

$$\begin{aligned}\tilde{L}_k &= \frac{1}{\sigma^2}\left(\min_{x|b_k=0} - \min_{x|b_k=1}\right)\min_{x_2}\left(\frac{1}{K_1}|y_1-ax_1|^2+\frac{1}{K_2}|y_1-bx_1-cx_2|^2\right) \\ &= \frac{1}{\sigma^2}\left(\min_{x|b_k=0} - \min_{x|b_k=1}\right)\left(\frac{1}{K_1}|y_1-ax_1|^2+\frac{1}{K_2}\min_{x_2}|y_2-bx_1-cx_2|^2\right) \\ &= \frac{1}{\sigma^2}\left(\min_{x|b_k=0} - \min_{x|b_k=1}\right)\left(\frac{1}{K_1}|y_1-ax_1|^2+\frac{1}{K_2}|y_2-bx_1-S^c(y_2-bx_1)|^2\right)\end{aligned}$$

and where $(\min_x - \min_y)A$ is shorthand for $\min_x A - \min_y A$

In the last formula for $\tilde{L}_k$ in Equation 12, the search over all possible values of $x_2$ was replaced with the slicing operation $S^c(y)$. As pointed out before, finding a value of $x_2$ that minimizes the term $|y_2-bx_1-cx_2|^2$ thereby becomes a trivial task: the minimum value may be found by finding the constellation point closest to $(y_2-bx_1)$, which, in turn, may be found by using the slicing operation. This reduces the computational complexity by $O(M^2)$ compared to conventional ML schemes.

In one embodiment, the candidate constellation point $x_{1,i}$ which minimizes $D_i$ is found and returned as a hard output (block 209).

In another embodiment, the calculated log-likelihood $\tilde{L}_k$ is provided as soft output (block 210). This soft output may then be used in subsequent decoding, as indicated by block 112 in FIG. 1.

Figure 3:
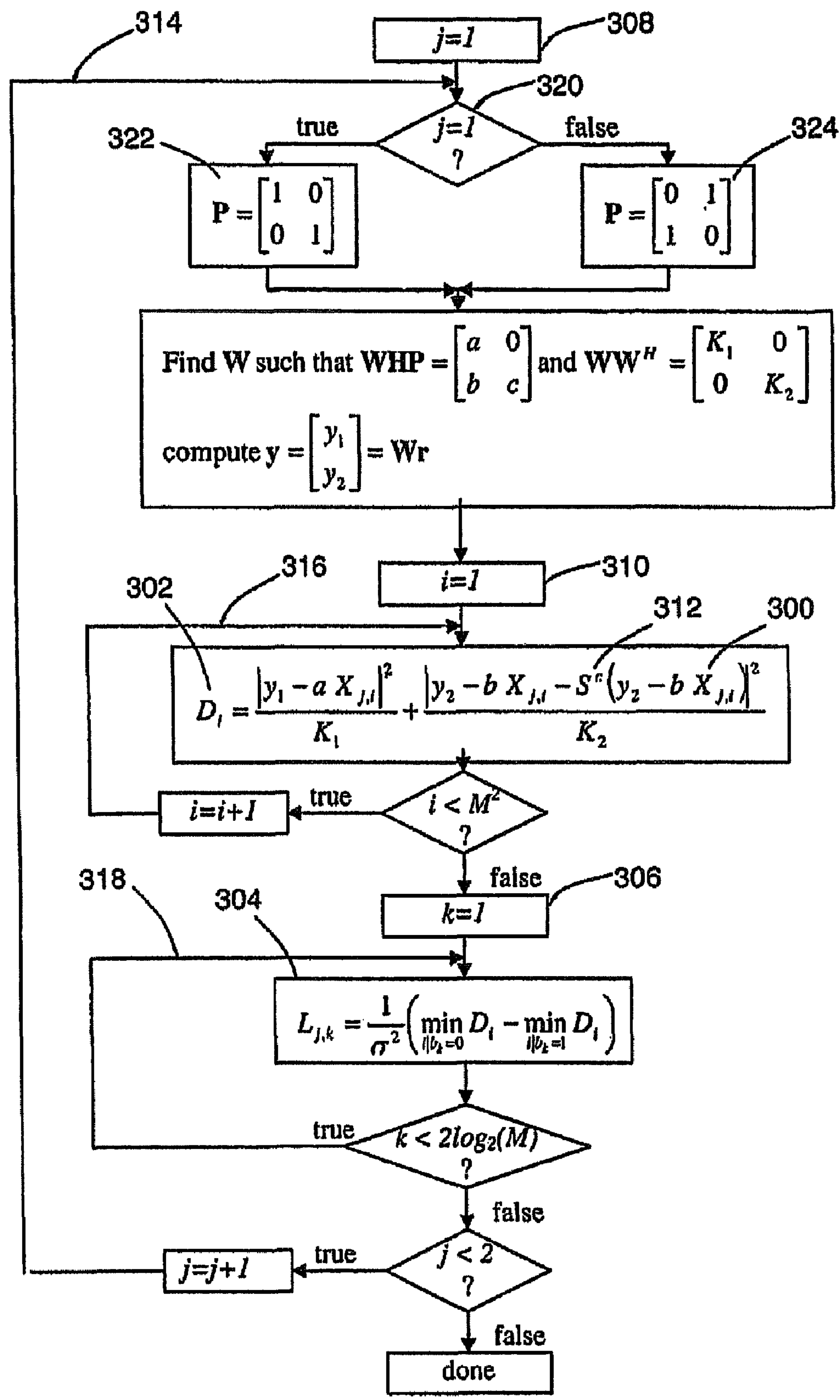
FIG. 3 is a simplified flowchart of one embodiment of a procedure for calculating log-likelihood ratios in accordance with the invention.

FIG. 3 shows a flowchart illustrating one embodiment of a procedure for finding the soft output $\tilde{L}_k$. In the flow chart, the set of valid constellation points is represented by $X_{j,i}$ 300, with i=1 . . . $M^2$ for each transmit stream j=1 . . . 2. The value $D_i$ 302 represents a distance metric for each candidate constellation point $X_{j,i}$ 300. The result $L_{j,k}$ 304 is the log-likelihood ratio for bit position k of transmit stream j.

Accordingly, the procedure of the exemplary embodiment shown in the flowchart in FIG. 3 involves iteration through an outer loop j=1 . . . 2 (commencing at block 308 and looping as represented by line 314) and two sequential inner loops i=1 . . . $M^2$ (commencing at block 310 and looping as represented by line 316) and k=1 . . . 2 $\log_2(M)$ (commencing at block 306 and looping as represented by line 318).

As represented by blocks 320, 322, 324 the P matrix may be selected as discussed above in conjunction with Equation 4. Then, the matrix W may be calculated as discussed above in conjunction with Equation 3.

Calculation of distance metrics $D_i$ 302 as well as the slicing operation 312 may both be performed within the first inner loop. Here, this first inner loop has $M^2$ iterations. Therefore, the number of distance metric computations may be reduced by a factor of $M^2$ compared to conventional ML schemes.

Block 304 and loop 318 demonstrate the calculation of a soft output, for those embodiments in which a soft output is computed. For each bit position k represented in symbol $x_j$, the minimum distance metric over all constellations points with bit k equal to 0 may be found. Likewise, the minimum distance metric over all constellation points with bit k equal to 1 may be found. These two values are combined by subtraction to produce a soft output. When scaled properly by an estimate of the noise variance, this soft output may represent the log-likelihood ratio of bit k.

In those embodiments in which a soft output is not computed (i.e. uncoded systems or systems with hard-input decoders), the calculation of the soft output represented by block 304 and loop 318 may be omitted. Instead, the global minimum over all distance metrics may be found, where the constellation point associated with said minimum represents the hard decision.

For simplicity of notation, the description herein assumed the same constellation for both transmit streams. However, in general, the present invention accommodates different constellations (i.e., different bit rates) on different transmit streams. The description above also only lays out a limited set of embodiments of the invention and it should be understood that other embodiments may be implemented in accordance with the teachings of the invention. In addition, modifications may be made to the embodiments described above that are still within the scope of the invention.

The teachings herein may be incorporated into a variety of systems. For example, the teachings may be incorporated into a wireless communications system such as one that supports one or more RF wireless standards including, without limitation, IEEE 802.11a, 802.11g, 802.11n, etc. The teachings herein also may be incorporated into other wireless or wired systems.

In one embodiment of the invention, a multiple-input multiple-output transmissions is detected by: receiving a plurality of signals; combining the plurality of signals to produce a plurality of combined signals, wherein the plurality of combined signals includes a first spatial stream, representing a series of first transmitted constellation points, with each transmitted constellation point being a member of a first set of candidate constellation points, and where each candidate constellation point represents a contribution to the plurality of combined signals, and a second spatial stream, representing a series of second transmitted constellation points, with each second transmitted constellation point being a member of a second set of candidate constellation points; and subtracting the contribution to the plurality of combined signals and calculating a distance metric using a slicer to determine a closest candidate constellation point among the second set of candidate constellation points for each candidate constellation point of the first set of candidate constellation points.

In one aspect of the invention, the plurality of signals are combined by multiplying the plurality of signals with a matrix W, wherein the product of a Hermitian transposition of the matrix W and the matrix W equals a diagonal or nearly diagonal matrix. The product of this matrix W and a channel matrix H may be triangular or nearly triangular.

In another aspect of the invention, the candidate constellation points of the first set of candidate constellation points represents bits. For each bit B represented in candidate constellation points of the first set of candidate constellation points: a first minimum distance metric is found among the distance metrics, wherein a value of bit B of the candidate constellation point associated with the first minimum distance metric is zero; a second minimum distance metric among the distance metrics is found, wherein a value of bit B of the candidate constellation point associated with the second minimum distance metric is one; and soft output is produced by calculating a difference between the first minimum distance metric and the second minimum distance metric.

In yet another aspect of the invention, one candidate constellation point is found among the first set of candidate constellation points to produce a hard output, wherein the distance metric calculated for the one candidate constellation point is a minimum distance metric among the distance metrics calculated for the first set of candidate constellation points.

In another embodiment of the invention, multiple-input multiple-output transmissions are detected by receiving a plurality of signals and combining the plurality of signals to produce a plurality of combined signals, the plurality of combined signals being usable to calculate distance metrics using a slicing operation.

In one aspect of the invention, the plurality of signals are combined by multiplying a vector representing the plurality of signals or a matrix representing the plurality of signals with another matrix W, wherein a product of a Hermitian transposition of the matrix W and the matrix W equals a diagonal or nearly diagonal matrix. The matrix W may be selected such that a product of the matrix W and a channel matrix H is triangular or nearly triangular.

In another aspect of the invention, a plurality of distance metrics is calculated using the plurality of combined signals. The plurality of distance metrics may be calculated using a slicing operation. A candidate constellation point may be identified that minimizes a value of a corresponding distance metric among the plurality of distance metrics. Log-likelihood ratios may be calculated for a plurality of bits represented in one or more transmitted symbols using the plurality of distance metrics, the transmitted symbols having been transmitted using the plurality of signals.

It should further be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments, code such as software or firmware executing on one or more processing devices may be used to implement one or more of the described operations.

While certain exemplary embodiments have been described above in detail and shown in the accompanying drawings, it is to be understood that such embodiments are merely illustrative of and not restrictive of the invention. In particular, it should be recognized that the teachings of the invention apply to a wide variety of systems and processes. It will thus be recognized that various modifications may be made to the illustrated and other embodiments of the invention described above, without departing from the inventive scope. In view of the above it will be understood that the invention is not limited to the particular embodiments or arrangements disclosed, but is rather intended to cover any changes, adaptations or modifications which are within the scope and spirit of the invention.

What is claimed is:

1. A method, performed by one or more processors and/or circuits integrated within a single chip, of detecting multiple-input multiple-output transmissions, comprising:
   receiving a plurality of signals;
   combining the plurality of signals to produce a plurality of combined signals, the plurality of combined signals comprising a first contribution from a first set of candidate constellation points and a second contribution from a second set of candidate constellation points;
   for each of the candidate constellation points in the first set of candidate constellation points, generating a difference signal by subtracting the first contribution from the plurality of combined signals; and
   calculating a distance metric using a slicing operation, on the difference signal, to determine a closest candidate constellation point among the second set of candidate constellation points.

2. The method of claim 1, wherein the plurality of signals are combined by multiplying a vector representing the plurality of signals or a matrix representing the plurality of signals with another matrix W, wherein a product of a Hermitian transposition of the matrix W and the matrix W equals a diagonal or nearly diagonal matrix.

3. The method of claim 2, comprising selecting the matrix W such that a product of the matrix W and a channel matrix H is triangular or nearly triangular.

4. The method of claim 1, comprising: calculating a plurality of distance metrics using the plurality of combined signals.

5. The method of claim 4, comprising calculating the plurality of distance metrics using a slicing operation.

6. The method of claim 4, comprising:
   identifying a candidate constellation point that minimizes a value of a corresponding distance metric among the plurality of distance metrics.

7. A detector, configured to detect multiple-input multiple-output transmissions, comprising:
   a signal receiver, configured to receive a plurality of signals; and
   a signal combiner, configured to:
      combine the plurality of signals to produce a plurality of combined signals, the plurality of combined signals comprising a first contribution from a first set of candidate constellation points and a second contribution from a second set of candidate constellation points;
      generate a difference signal by subtracting the first contribution from the plurality of combined signals for each of the candidate constellation points in the first set of candidate constellation points; and
      calculate a distance metric using a slicing operation, on the difference signal, to determine a closest candidate constellation point among the second set of candidate constellation points.

8. The detector of claim 7, wherein the signal combiner combines the plurality of signals by multiplying a vector representing the plurality of signals or a matrix representing the plurality of signals with another matrix W, wherein a product of a Hermitian transposition of the matrix W and the matrix W equals a diagonal or nearly diagonal matrix.

9. The detector of claim 8, comprising the signal combiner being configured to select the matrix W such that a product of the matrix W and a channel matrix H is triangular or nearly triangular.

10. The detector of claim 7, comprising: a distance metrics calculator, configured to calculate a plurality of distance metrics using the plurality of combined signals.

11. The detector of claim 10, comprising: a slicer, wherein the distance metrics calculator is configured to calculate the plurality of distance metrics using the slicer.

12. The detector of claim 10, comprising:
   a constellation point identifier, configured to identify a candidate constellation point that minimizes a value of a corresponding distance metric among the plurality of distance metrics.

13. A computer program product stored on a non-transitory computer-readable medium, comprising:
   computer-readable program code executable by a machine for causing the machine to:
   receive a plurality of signals;
      combine the plurality of signals to produce a plurality of combined signals, the plurality of combined signals to comprising a first contribution from a first set of candidate constellation points and a second contribution from a second set of candidate constellation points;
      generate a difference signal by subtracting the first contribution from the plurality of combined signals for each of the candidate constellation points in the first set of candidate constellation points; and
      calculate a distance metric using a slicing operation, on the difference signal, to determine a closest candidate constellation point among the second set of candidate constellation points.

14. The computer program product of claim 13, wherein the computer-readable program code is executable by a machine for causing the machine to combine the plurality of signals by multiplying a vector representing the plurality of signals or a matrix representing the plurality of signals with another matrix W, wherein a product of a Hermitian transposition of the matrix W and the matrix W equals a diagonal or nearly diagonal matrix.

15. The computer program product of claim 13, wherein the non-transitory computer-readable medium is an integrated circuit or a computer chip.

16. The computer program product of claim 14, comprising computer-readable program code executable by a machine for causing the machine to select the matrix W such that a product of the matrix W and a channel matrix H is triangular or nearly triangular.

17. The computer program product of claim 13, comprising:
   computer-readable program code executable by a machine for causing the machine to calculate a plurality of distance metrics using the plurality of combined signals.

18. The computer program product of claim 17, wherein the computer-readable program code executable by a machine for causing the machine to calculate the plurality of distance metrics uses a slicing operation.

19. The computer program product of claim 17, comprising:
   computer-readable program code executable by a machine for causing the machine to identify a candidate constellation point that minimizes a value of a corresponding distance metric among the plurality of distance metrics.

20. The computer program product of claim 17, comprising:

computer-readable program code executable by a machine for causing the machine to calculate log-likelihood ratios for a plurality of bits represented in one or more transmitted symbols using the plurality of distance metrics, the transmitted symbols having been transmitted using the plurality of signals.

* * * * *